(12) United States Patent
Katou (10) Patent No.: US 10,206,101 B2
(45) Date of Patent: Feb. 12, 2019

(54) PORTABLE COMMUNICATION APPARATUS, VEHICLE CONTROL APPARATUS, AND VEHICLE CONTROL SYSTEM

(71) Applicant: DENSO CORPORATION, Kariya, Aichi-pref. (JP)

(72) Inventor: Kenji Katou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 236 days.

(21) Appl. No.: 15/103,575

(22) PCT Filed: Oct. 27, 2014

(86) PCT No.: PCT/JP2014/005423
§ 371 (c)(1),
(2) Date: Jun. 10, 2016

(87) PCT Pub. No.: WO2015/107578
PCT Pub. Date: Jul. 23, 2015

(65) Prior Publication Data
US 2016/0309325 A1    Oct. 20, 2016

(30) Foreign Application Priority Data

Jan. 20, 2014 (JP) ................................. 2014-007873

(51) Int. Cl.
*H04W 12/06* (2009.01)
*B60R 25/24* (2013.01)
(Continued)

(52) U.S. Cl.
CPC ........... *H04W 12/06* (2013.01); *B60R 25/209* (2013.01); *B60R 25/24* (2013.01); *B60R 25/241* (2013.01);
(Continued)

(58) Field of Classification Search
None
See application file for complete search history.

(56) References Cited

U.S. PATENT DOCUMENTS 6,538,560 B1 * 3/2003 Stobbe .................... B29C 44/56
340/5.72
8,751,065 B1 * 6/2014 Kato .................. H04M 1/72533
340/426.13
(Continued)

FOREIGN PATENT DOCUMENTS

JP        3410226 B2    5/2003

*Primary Examiner* — Lynn D Feild
*Assistant Examiner* — Richard A McCoy
(74) *Attorney, Agent, or Firm* — Harness, Dickey & Pierce, P.L.C.

(57) ABSTRACT

A portable communication apparatus, which communicates with vehicle control apparatuses that respectively control vehicles to achieve authentication with respect the vehicle control apparatuses, includes an authentication information change section and a post-change communication section. The authentication information change section communicates with a first vehicle control apparatus, by using a first communication technique, to change authentication information that is used in the first vehicle control apparatus to authenticate the portable communication apparatus. Upon receipt of a notice indicative of having changed the authentication information from the first vehicle control apparatus, the post-change communication section communicates with a second vehicle control apparatus, by using a second communication technique.

1 Claim, 9 Drawing Sheets (51) Int. Cl.
  *B60R 25/20* (2013.01)
  *G07C 9/00* (2006.01)
  *H04W 4/04* (2009.01)

(52) U.S. Cl.
  CPC ........ *G07C 9/00309* (2013.01); *H04W 4/046* (2013.01); *G07C 2009/00357* (2013.01); *G07C 2009/00793* (2013.01)

(56) References Cited

U.S. PATENT DOCUMENTS

| | | | | |
|---|---|---|---|---|
| 9,497,177 B2* | 11/2016 | Fujiki | ............... | H04L 63/08 |
| 2009/0079225 A1* | 3/2009 | Katou | ............... | E05B 77/48 |
| | | | | 296/97.22 |
| 2010/0109836 A1* | 5/2010 | Sakuma | ............ | B60R 25/02 |
| | | | | 340/5.61 |
| 2010/0321173 A1* | 12/2010 | Magner | ........... | G07C 9/00182 |
| | | | | 340/426.1 |
| 2012/0310447 A1* | 12/2012 | Toki | ................ | B60R 25/24 |
| | | | | 701/2 |
| 2013/0005302 A1* | 1/2013 | Ozaki | ............. | H04L 63/0876 |
| | | | | 455/411 |
| 2013/0212704 A1* | 8/2013 | Shablygin | ........ | G06F 21/6218 |
| | | | | 726/28 |
| 2015/0003613 A1* | 1/2015 | Kawamura | ........ | H04L 9/0861 |
| | | | | 380/278 |

* cited by examiner

PORTABLE COMMUNICATION APPARATUS, VEHICLE CONTROL APPARATUS, AND VEHICLE CONTROL SYSTEM

CROSS REFERENCE TO RELATED APPLICATIONS

The application is a U.S. National Phase Application under 35 U.S.C. 371 of International Application No. PCT/JP2014/005423 filed on Oct. 27, 2014 and published in Japanese as WO 2015/107578 A1 Jul. 23, 2015. This application is based on and claims the benefit of priority from Japanese Patent Application No. 2014-007873 filed on Jan. 20, 2014. The entire disclosures of all of the above applications are incorporated herein by reference.

TECHNICAL FIELD

The present disclosure relates to a portable communication apparatus capable of being authenticated with respect to a vehicle control apparatus, to the vehicle control apparatus, and to a vehicle control system that includes the portable communication apparatus and the vehicle control apparatus.

BACKGROUND ART

There is conventionally known a vehicle control system that allows a portable communication apparatus to be authenticated with respect to a vehicle control apparatus and, if the authentication is successful, permits vehicle control to be exercised to unlock a door or start an engine (e.g., refer to Patent Literature 1).

PRIOR ART LITERATURES

Patent Literature

Patent Literature 1: JP 3410226 B2

SUMMARY OF INVENTION

When authentication information about the portable communication apparatus is to be changed and registered in the vehicle control apparatus in the above-mentioned vehicle control system, the portable communication apparatus is positioned near the vehicle control apparatus to establish a short-range wireless communication and let the vehicle control apparatus read the authentication information recorded in the portable communication apparatus and change its registration. The vehicle control system is demanded to provide increased work efficiency by exchanging the authentication information with a plurality of the vehicle control apparatuses while maintaining an adequate level of security.

It is an object of the present disclosure to enable a portable communication apparatus capable of being authenticated with respect to a vehicle control apparatus, the vehicle control apparatus, and a vehicle control system including the portable communication apparatus and the vehicle control apparatus to exchange, for example, authentication information with a plurality of the vehicle control apparatuses while maintaining an adequate level of security.

To achieve the above object, according to an example of the present disclosure, a portable communication apparatus is provided to be capable of communicating with a plurality of vehicle control apparatuses that respectively control a plurality of vehicles, and capable of achieving authentication with respect the vehicle control apparatuses. The portable communication apparatus includes an authentication information change section and a post-change communication section. The authentication information change section communicates with a first vehicle control apparatus that is one of the plurality of vehicle control apparatuses, by using a predefined first communication technique, to change authentication information that is used in the first vehicle control apparatus to authenticate the portable communication apparatus. Upon receipt of a notice indicative of having changed the authentication information from the first vehicle control apparatus, the post-change communication section communicates with a second vehicle control apparatus that is one of the plurality of vehicle control apparatuses and different from the first vehicle control apparatus, by using a second communication technique that is different from the first communication technique.

That is, the portable communication apparatus according to the example of the present disclosure communicates with the first vehicle control apparatus in order to overwrite the authentication information recorded in the first vehicle control apparatus, register new authentication information, delete registered authentication information, or otherwise change the authentication information, and then communicates with the second vehicle control apparatus upon completion of the above authentication information change.

The above-described portable communication apparatus communicates with the second vehicle control apparatus upon completion of an authentication information change in the first vehicle control apparatus. This configuration provides improved security as compared to a configuration where communication is constantly established. Further, the use of different communication techniques provides a higher level of security than the use of a single communication technique. The authentication information can therefore be exchanged with a plurality of the vehicle control apparatuses while maintaining an adequate level of security.

According to another example of the present disclosure, the present disclosure may be configured as a vehicle control apparatus or as a vehicle control system that includes a portable communication apparatus and a vehicle control apparatus.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments of the present disclosure will now be described with reference to the accompanying drawings.

[Configuration of Embodiment]

A vehicle control system 1 according to an embodiment of the present disclosure is capable of providing vehicle control by establishing communication for authentication between a UID (user identification device) 40, which is a portable instrument possessed by a user, and BCMs (body control modules) 10a, 10b, which are respectively mounted in two vehicles. Particularly, the vehicle control system 1 according to the present embodiment is adapted so that, if vehicle information for authentication is changed in one BCM, the associated vehicle information can be changed in the other BCM by performing a single process.

In the present application, the word "information" is used not only as an uncountable noun but also as a countable noun.

Figure 1A:
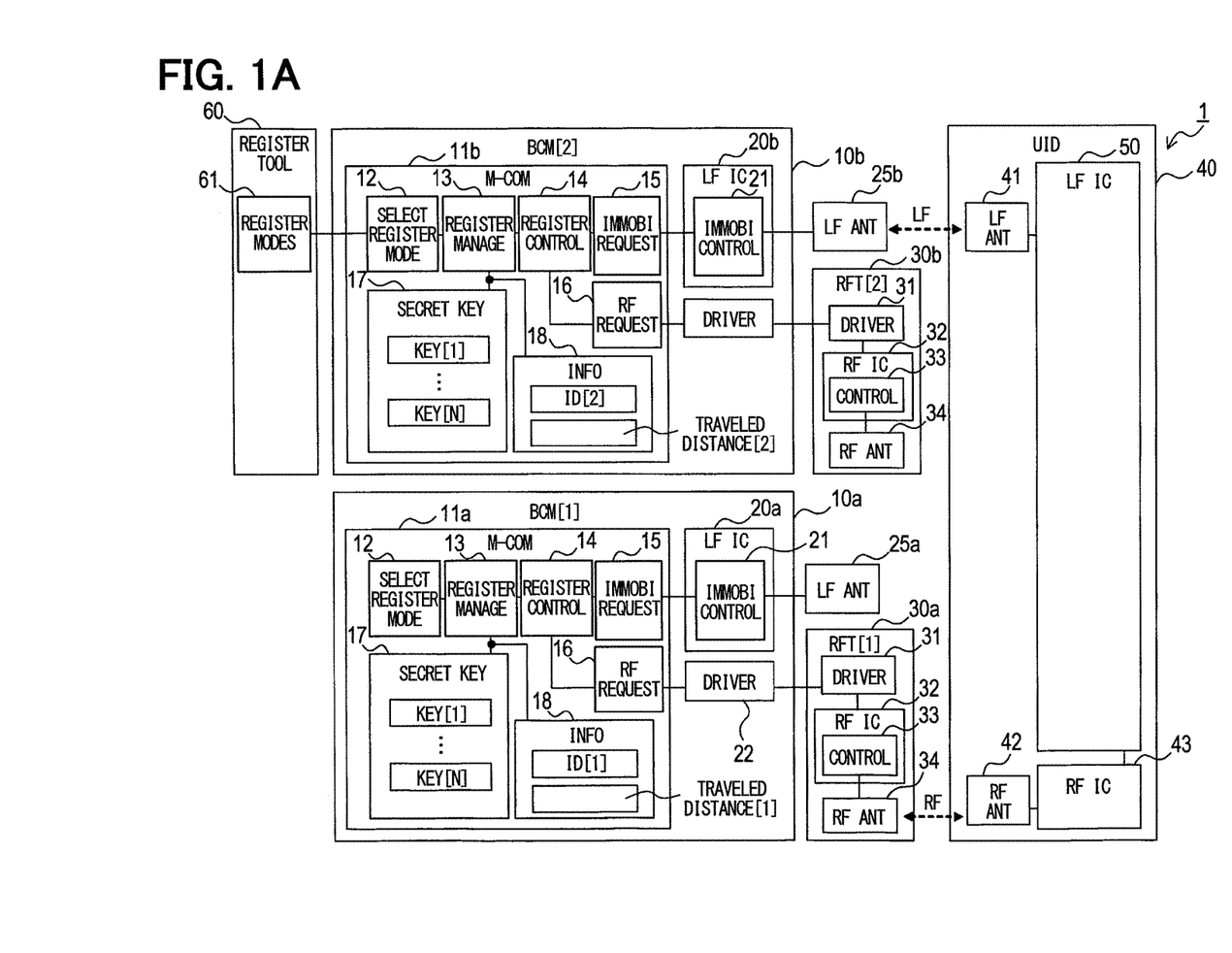
FIG. 1A is a schematic block diagram illustrating a configuration of a vehicle control system according to the present disclosure.
Figure 1B:
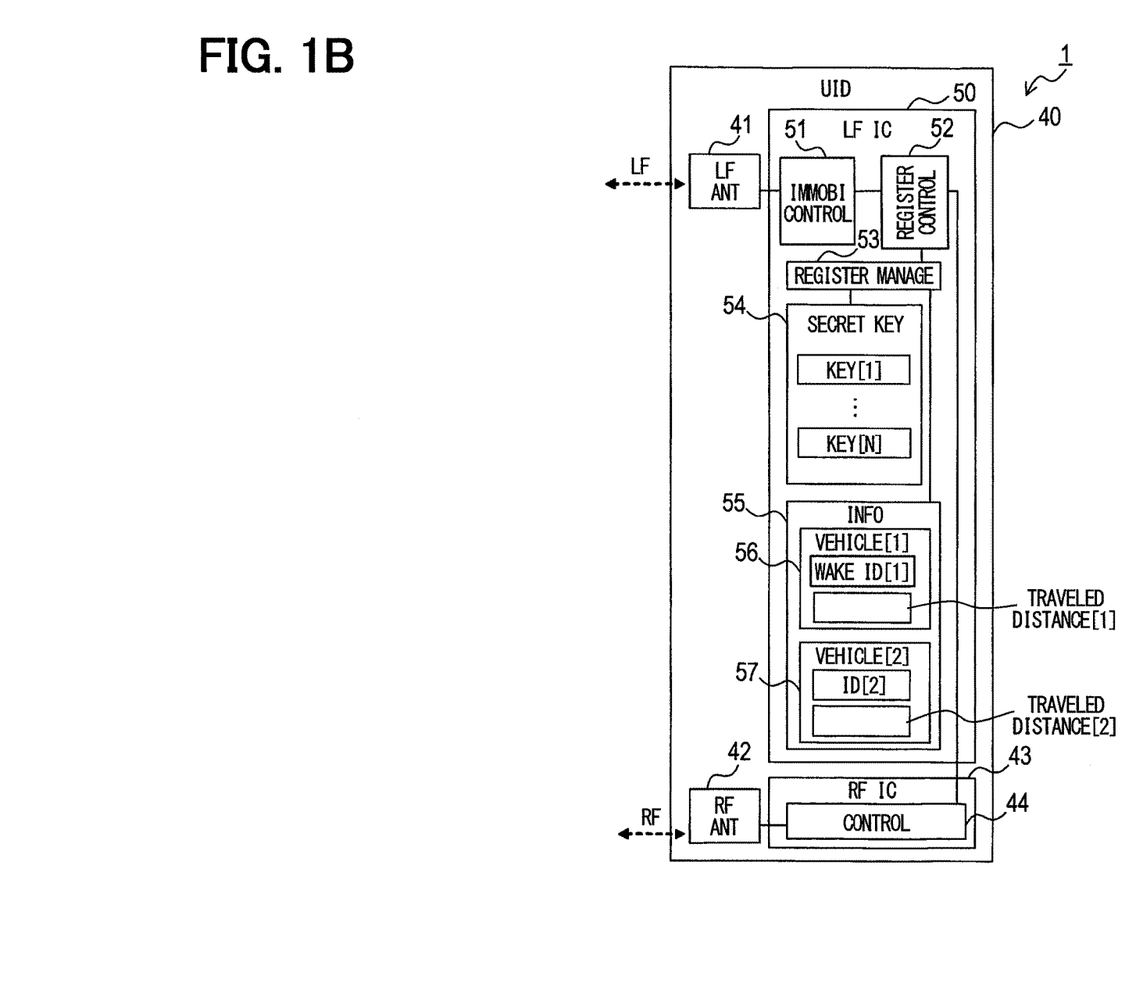
FIG. 1B is a schematic block diagram illustrating a configuration of a vehicle control system according to the present disclosure.

More specifically, as in FIG. 1, the vehicle control system 1 includes the BCMs 10a, 10b, the UID 40, a registration tool 60, and RFTs (radio-frequency transceivers) 30a, 30b.

The BCMs 10a, 10b are respectively mounted in different vehicles and used to authenticate the UID 40. When the authentication is successful, the BCMs 10a, 10b transmit an operation permission signal to a vehicle's drive apparatus (for example, an engine control apparatus (unshown)). In other words, the UID 40 functions as a vehicle's wireless key (portable instrument), and the BCMs function as an authentication apparatus for the wireless key.

The RFTs 30a, 30b are respectively incorporated in the BCMs 10a, 10b. The BCMs 10a, 10b and the registration tool 60 are configured as a computer (microcomputer) having, for example, a CPU and a memory (unshown).

Various registration modes 61 are recorded in the registration tool 60 and used to select one registration mode. When the user selects one of the registration modes 61 while the registration tool 60 is connected to a BCM (BCM [2] 10b in the present example), a command for changing the vehicle information is outputted to the connected BCM.

The BCMs 10a, 10b each function as a registration mode selection section 12, a registration management section 13, a registration control section 14, an immobilizer transmission/reception request section 15, and an RF transmission/reception request section 16. Further, secret keys 17 and vehicle information 18 are recorded in the BCMs 10a, 10b. In the drawings, the immobilizer is abbreviated to "immobi".

When the registration tool 60 is connected to BCM [2] 10b, the registration mode selection section 12 selects a process from prepared programs on the basis of a mode selected from the registration tool 60, and performs the selected process. The present embodiment will be described mainly with reference to a process of changing authentication information (vehicle information). A process of achieving authentication with respect to the UID 40 and transmitting the operation permission signal will not be described in detail. A well-known technology can be applied to the process of achieving authentication with respect to the UID 40 and transmitting the operation permission signal.

The registration management section 13, for example, reads or writes the vehicle information 18 and reads the secret keys 17 on the basis of a process performed by the registration mode selection section 12.

The registration control section 14 manages the transmission and reception of data on the basis of the function of the registration mode selection section 12. When the data is to be transmitted or received, the registration control section 14 provides highly confidential communication by performing encryption or decryption through the use of one of a plurality of secret keys recorded in a recording area for the secret keys 17.

The immobilizer transmission/reception request section 15 manages the operation of an interface that manages the transmission and reception of data for LF (low-frequency) communication. More specifically, the immobilizer transmission/reception request section 15 communicates with the UID 40 to let the BCMs 10a, 10b function as a well-known immobilizer, and exchanges data (update the vehicle information) about registration for functioning as an immobilizer.

The RF transmission/reception request section 16 manages the operation of an interface that manages the transmission and reception of data for RF (radio-frequency) communication. More specifically, RF transmission/reception request section 16 exchanges data (update the vehicle information) about registration for functioning as an immobilizer.

The BCMs 10a, 10b include LFICs 20a, 20b, which are circuits for LF communication, and a communication driver 22, which communicates with the RFTs 30a, 30b. The LFICs 20a, 20b are disposed between LF antennas 25a, 25b and microcomputers 11a, 11b, and function as an immobilizer transmission/reception control section 21 that transmits data through LF communication in compliance with a transmission instruction from the microcomputers 11a, 11b and transmits data received through the LF antennas 25a, 25b to the microcomputers 11a, 11b.

The RFTs 30a, 30b include a communication driver 31, an RFIC 32, and an RF antenna 34. The communication driver 31 communicates with communication drivers for the BCMs 10a, 10b, and other apparatuses. The RFIC 32 functions as an RF transmission/reception control section 33 that establishes RF communication to transmit and receive data through the RF antenna 34.

The UID 40 includes an LF antenna 41, an RF antenna 42, an RFIC 43, and an LFIC 50. The RFIC 43 is configured as a circuit that transmits or receives data through the RF antenna 42 in compliance with an instruction from the LFIC 50.

The LFIC 50 functions as an immobilizer transmission/reception control section 51, a registration control section 52, and a registration management section 53. These functional sections are equivalent to the immobilizer transmission/reception control section 21, registration control section 14, and registration management section 13 in the BCMs 10a, 10b.

Further, the LFIC 50 records secret keys 54 and vehicle information 55. The secret keys 54 and the vehicle information 55 are equivalent to the secret keys 17 and the vehicle information in the BCMs 10a, 10b. The recorded vehicle information 55 includes vehicle information 56 about vehicle [1] (BCM [1] 10a) and vehicle information 57 about vehicle [2] (BCM [2] 10b).

[Processes of Present Embodiment]

Figure 2:
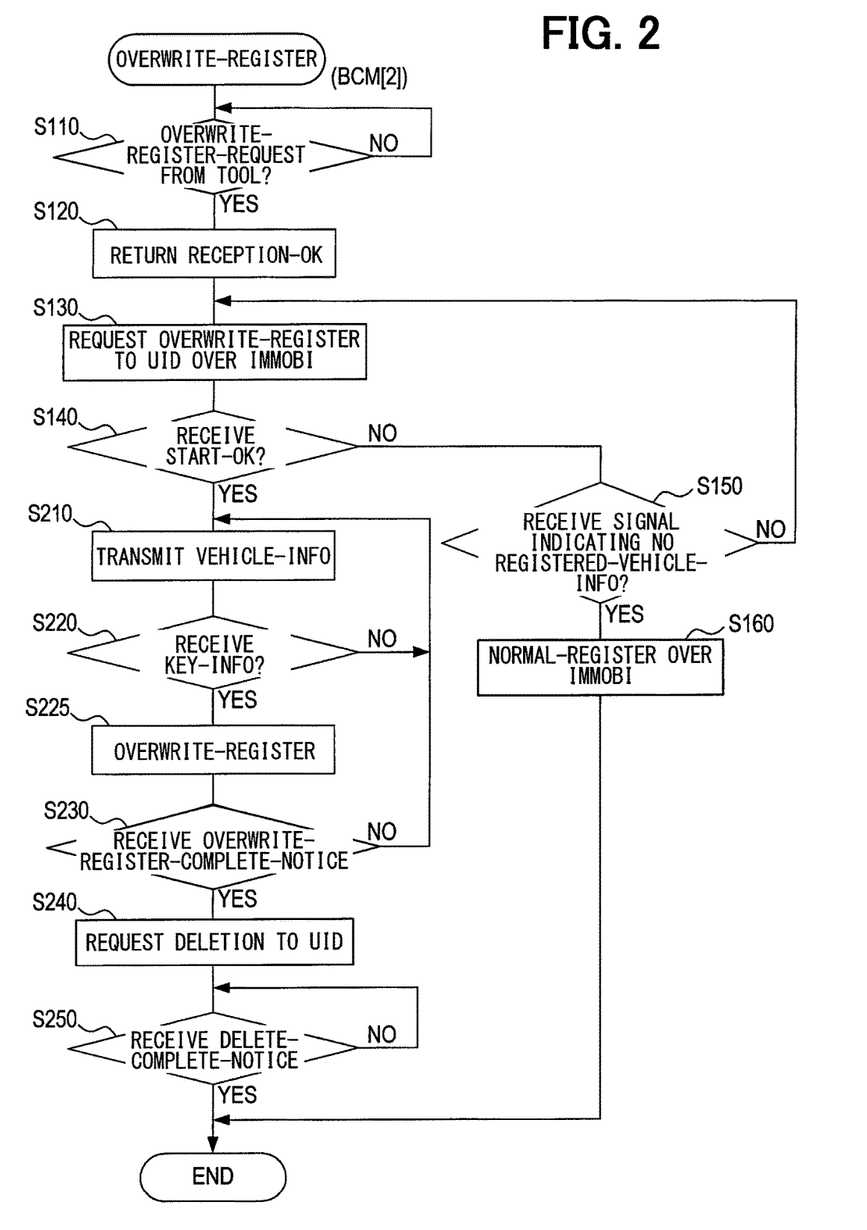
FIG. 2 is a flowchart illustrating an overwrite registration process that is performed by a microcomputer of BCM [2]

In the vehicle control system 1 configured as above, BCM [2] 10b performs an overwrite registration process illustrated in FIG. 2.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section (e.g., integrated circuit, hard-wired logic circuit), including or not including a function of a related apparatus; furthermore, the hardware section may be constructed inside of a microcomputer.

The overwrite registration process is performed when the user replaces an old vehicle (with a newly purchased vehicle). This process is performed to register (overwrite) key information about the UID 40 in the new vehicle (BCM [2] 10*b*) and delete the key information in the old vehicle (BCM [1] 10*a*).

The overwrite registration process by BCM [2] 10*b* is initiated when a vehicle in which BCM [2] 10*b* is mounted is turned on, and subsequently repeated at fixed time intervals. In the overwrite registration process, a check is performed to determine whether an overwrite registration request is issued from the registration tool 60 to BCM [2] 10*b* (S110), as in FIG. 2.

Figure 3:
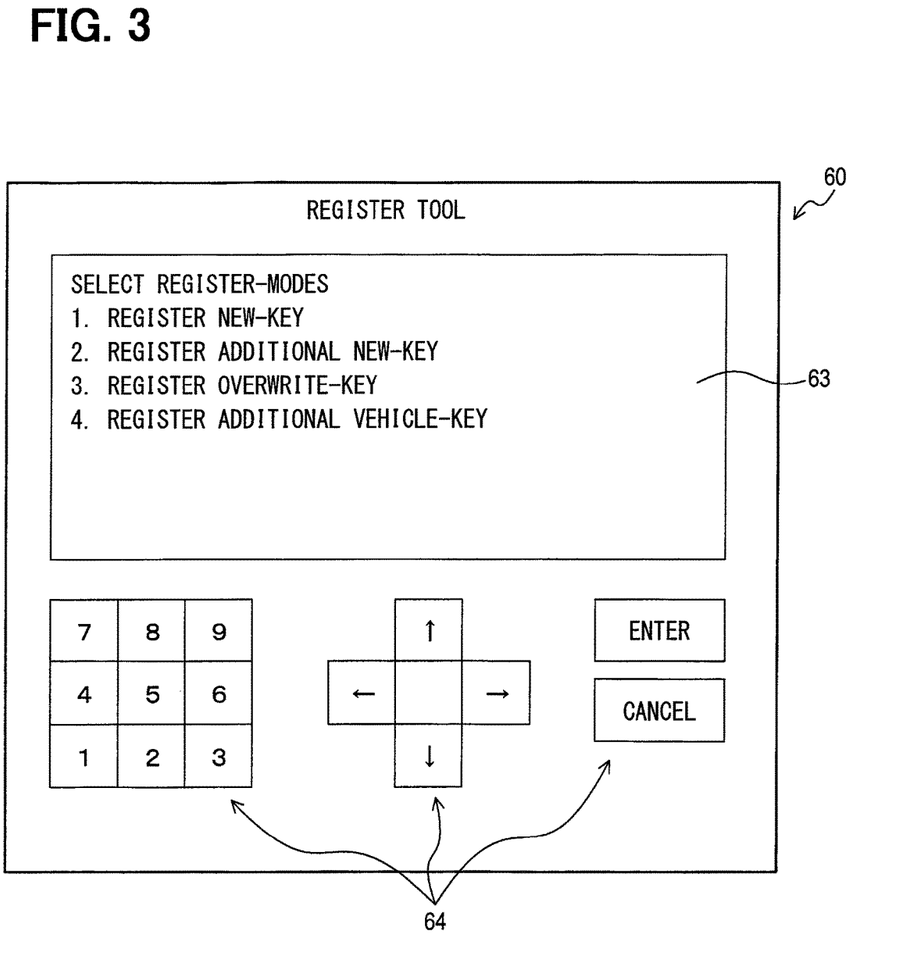
FIG. 3 is a diagram illustrating an exemplary configuration of a registration tool.

The registration tool 60 includes a display 63 and a manipulation section 64 as in FIG. 3. The display 63 displays an image indicative of selectable registration modes. The manipulation section 64 enables the user to select a registration mode. The user is supposed to select and execute one of the registration modes displayed on the display 63. FIG. 3 depicts four registration modes, namely, (1) new key registration (no key is registered in the vehicle), (2) new key additional registration (a key is registered in the vehicle), (3) overwrite key registration (overwriting a registered key), and (4) additional vehicle key registration (registering a registered key in another vehicle).

In S110, when the user selects "3. Overwrite Key Registration" from the display 63, it is determined that an overwrite registration request is issued. If the overwrite registration request is not issued (S110: NO), S110 is repeated.

If the overwrite registration request is issued (S110: YES), a response indicative of the reception of the overwrite registration request (reception OK) is returned to the registration tool 60 (S120). Next, the UID 40 is requested to start overwrite registration through immobilizer communication (encrypted LF communication) (S130).

A check is performed to determine whether a signal indicating that overwrite registration can be started (start OK) is received from the UID 40 (S140). If such a signal is not received (S140: NO), a check is performed to determine whether a signal indicating that there is no registered vehicle information is received from the UID 40 (S150). If such a signal is not received (S150: NO), processing returns to S120.

If the signal indicating that there is no vehicle information is received (S150: YES), normal immobilizer communication is established with the UID 40 to perform conventional common new key registration (vehicle information registration) (S160). In other words, vehicle authentication information for achieving authentication with respect to the UID 40 (part of wake ID [2]) and traveled distance [2] are transmitted to the UID 40. Further, the key information (part of wake ID [2]) in the UID 40 is acquired. Mutual registration is then performed to achieve authentication by sharing the informations.

Upon completion of the above-described processing, the overwrite registration by BCM [2] 10*b* terminates. If the signal indicating that overwrite registration can be started (start OK) is received from the UID 40 in S140 (S140: YES), the vehicle information (vehicle authentication information and traveled distance [2]) is transmitted to the UID 40 (S210), and then a check is performed to determine whether the key information is received from the UID 40 (S220).

If the key information is not received (S220: NO), processing returns to S210. If, by contrast, the key information is received (S220: YES), the existing key information is overwritten by the received key information for registration purposes (S225). More specifically, the key information registered in BCM [2] 10*b* is deleted to register the newly received key information.

A check is performed to determine whether an overwrite registration completion notice indicative of the completion of overwrite registration in the UID 40 is received from the UID 40 (S230). If the overwrite registration completion notice is not received (S230: NO), processing returns to S210.

If the overwrite registration completion notice is received (S230: YES), the UID 40 is requested to delete information recorded in BCM [1] 10*a* (S240). Next, a check is performed to determine whether a deletion completion notice indicative of the deletion of the information is received from the UID 40 (S250).

If the deletion completion notice is not received (S250: NO), S250 is repeated. If, by contrast, the deletion completion notice is received (S250: YES), the overwrite registration process by BCM [2] 10*b* terminates.

Figure 4:
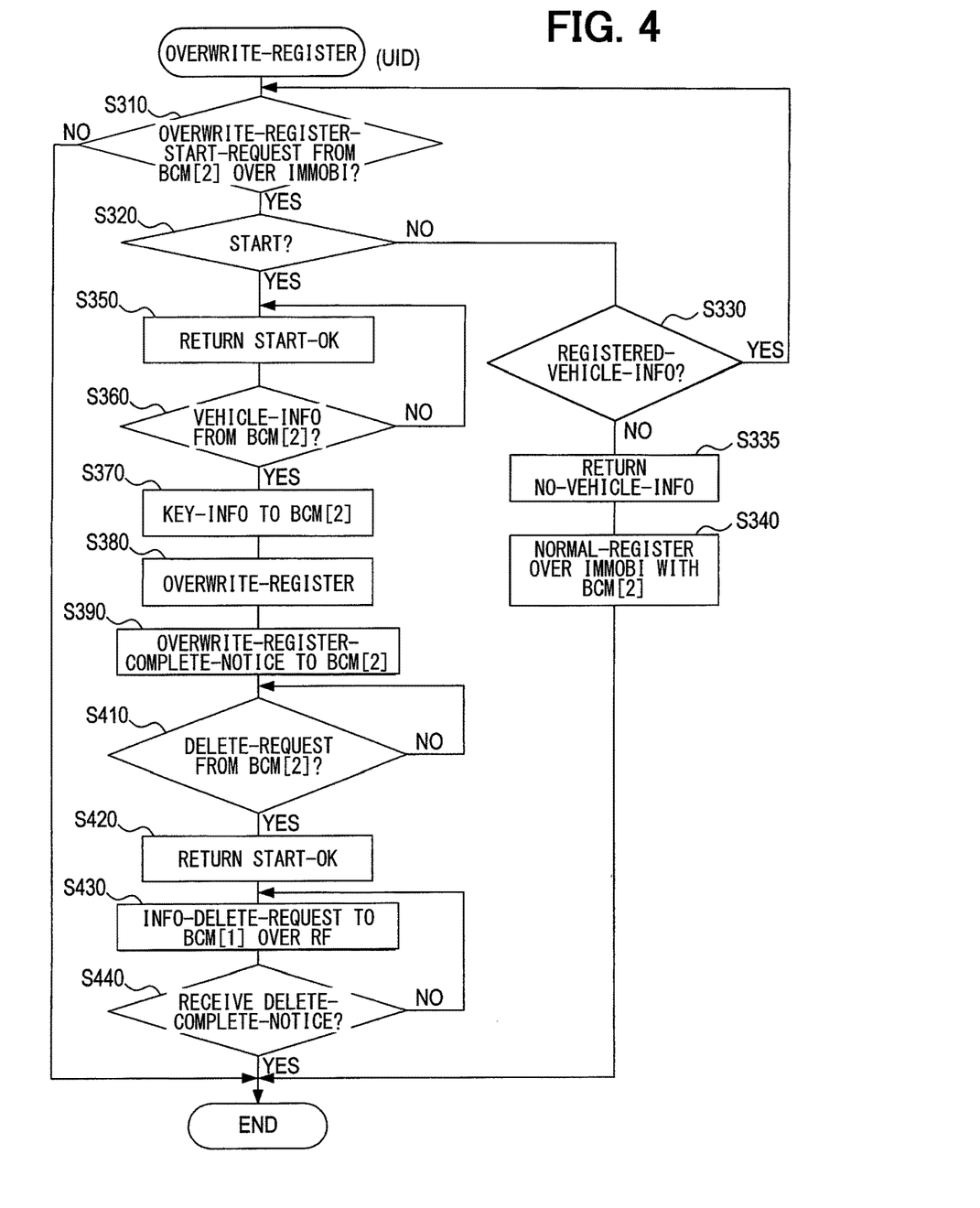
FIG. 4 is a flowchart illustrating an overwrite registration process that is performed by an LFIC of a UID.

As in FIG. 4, the UID 40 performs an overwrite registration process that corresponds to the overwrite registration process by BCM [2] 10*b*. The overwrite registration process by the UID 40 starts, for example, on a periodic basis.

In the overwrite registration process by the UID 40, a check is performed to determine whether an overwrite registration start request is received from BCM [2] 10*b* through immobilizer communication, as in FIG. 4 (S310). If the overwrite registration start request is not received (S310: NO), the overwrite registration process terminates.

If the overwrite registration start request is received (S310: YES), a check is performed to determine whether overwrite registration can be started (S320). The overwrite registration can be started when relevant conditions are satisfied, that is, when the vehicle information is already registered and an operating voltage (battery voltage) for the UID 40 is adequate.

If there is a problem with starting the overwrite registration (S320: NO), a check is performed to determine whether there is registered vehicle information (S330). If there is registered vehicle information (S330: YES), processing returns to S310.

If there is no registered vehicle information (S330: NO), normal immobilizer communication is established with BCM [2] 10*b* to perform new registration (vehicle information registration) in a normal manner (S340). Upon completion of such a new registration, the overwrite process by the UID 40 terminates.

If there is no problem with starting the overwrite registration (S320: YES), a signal indicating that the overwrite registration can be started (start OK) is returned to BCM [2] 10*b* (S350). Next, a check is performed to determine whether vehicle information is received from BCM [2] 10*b* (S360).

If the vehicle information is not received (S360: NO), processing returns to S360. If, by contrast, the vehicle information is received (S360: YES), key information is transmitted to BCM [2] 10*b* (S370) in order to perform the overwrite registration (S380). This overwrite registration is a process of overwriting the vehicle information (particularly wake ID [2] and traveled distance [2]) in vehicle [2].

An overwrite registration completion notice is transmitted to BCM [2] 10*b* (S390), and then a check is performed to determine whether a deletion request for deleting information registered in BCM [1] 10*a* is received (S410). If the deletion request is not received (S410: NO), S410 is repeated.

If the deletion request is received (S410: YES), a signal indicative of the start of a process relevant to the deletion request (start OK) is transmitted to BCM [2] 10*b* (S420), and then an information deletion request is transmitted to BCM [1] 10*a* through RF communication (S430). Subsequently, a check is performed to determine whether a deletion completion notice is received from BCM [1] 10*a* (S440).

If the deletion completion notice is not received (S440: NO), processing returns to S430. If, by contrast, the deletion completion notice is received (S440: YES), the overwrite registration process by the UID 40 terminates.

Figure 5:
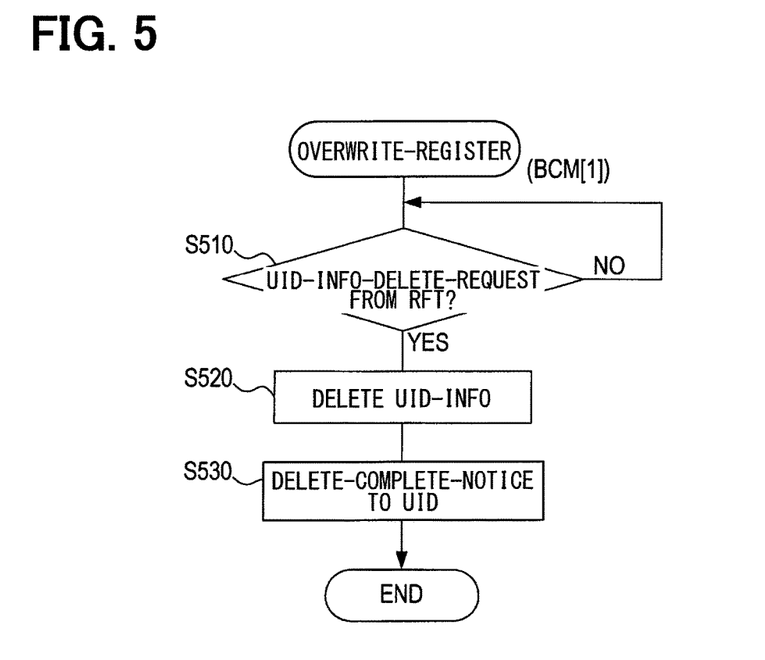
FIG. 5 is a flowchart illustrating an overwrite registration process that is performed by a microcomputer of BCM [1]

BCM [1] 10*a* performs an overwrite registration process that corresponds to the overwrite registration process by the UID 40. The overwrite registration process by BCM [1] 10*a* is initiated when a vehicle in which BCM [1] 10*a* is mounted is turned on, and subsequently repeated at fixed time intervals.

In this process, a check is performed to determine whether an information deletion request (a request for deleting information recorded in BCM [1] 10*a*) is received from the UID 40 (RFT 30*a*, 30*b*) (S510). If the information deletion request is not received (S510: NO), S510 is repeated.

If the information deletion request is received (S510: YES), information (key information) about the UID 40, which is registered as the vehicle information, is deleted (S520). A deletion completion notice is then transmitted to the UID 40 through RF communication (S530) to terminate the overwrite registration process by BCM [1] 10*a*.

Figure 6:
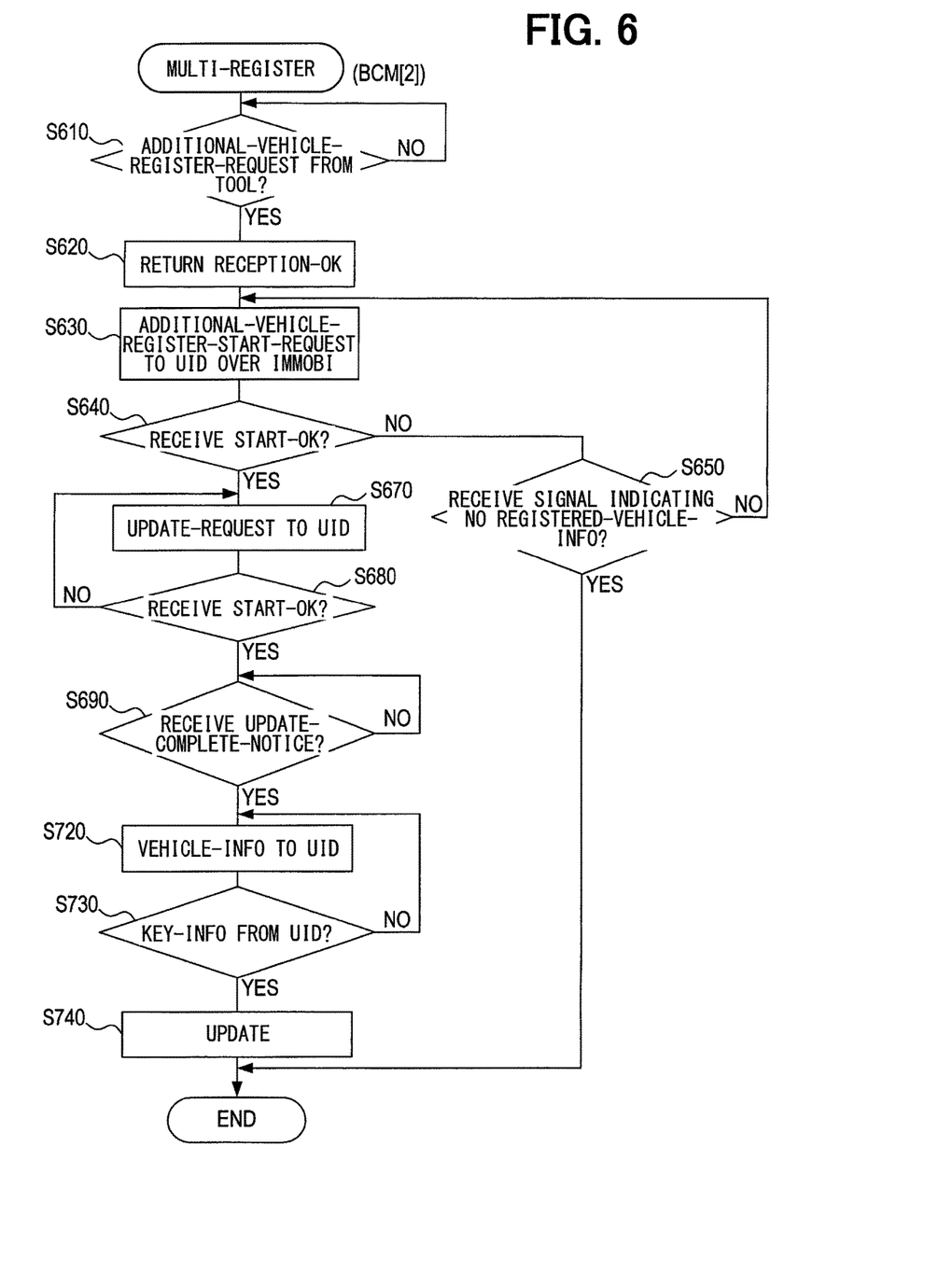
FIG. 6 is a flowchart illustrating a multiple registration process that is performed by the microcomputer of BCM [2]

A multiple registration process will now be described. This process corresponds to "4. Additional Vehicle Key Registration" (additional registration request) of the registration tool 60. The earlier-described overwrite registration process is used when one vehicle is to be replaced by another. However, the multiple registration process is used when a vehicle possessed by the user is to be added. Particularly, in the multiple registration process, vehicle information about a new vehicle (BCM [1] 10*a*) is additionally registered to permit a user possessing a certain other vehicle (BCM [2] 10*b*) to use the new vehicle with one UID 40.

The multiple registration process by BCM [2] 10*b* is initiated when a vehicle in which BCM [2] 10*b* is mounted is turned on, and subsequently repeated at fixed time intervals. Further, the multiple registration process is performed in parallel with the earlier-described overwrite registration process.

In the multiple registration process, a check is performed to determine whether an additional registration request is issued from the registration tool 60 to BCM [2] 10*b* (S610). If the additional registration request is not issued (S610: NO), S610 is repeated.

If the additional registration request is issued (S610: YES), a signal indicative of the reception of the additional registration request (reception OK) is returned to the registration tool 60 (S620). Subsequently, the UID 40 is requested to start additional vehicle registration by establishing immobilizer communication (S630).

A check is performed to determine whether a signal indicating that additional vehicle registration can be started (start OK) is received from the UID 40 (S640). If such a signal is not received (S640: NO), a check is performed to determine whether a signal indicating that there is no registered vehicle information is received from the UID 40 (S650). If such a signal is not received (S650: NO), processing returns to S620.

If the signal indicating that there is no registered vehicle information is received (S650: YES), the multiple registration process by BCM [2] 10*b* terminates.

If the signal indicating that additional vehicle registration can be started (start OK) is received from the UID 40 in S640 (S640: YES), the UID 40 is requested to update the vehicle information (S670). Subsequently, a check is performed to determine whether a signal permitting the start of update (start OK) is received from the UID 40 (S680).

If the signal permitting the start of update is not received (S680: NO), processing returns to S670. If, by contrast, the signal permitting the start of update is received (S680: YES), a check is performed to determine whether an update completion notice is received from the UID 40 (S690).

If the update completion notice is not received (S690: NO), S690 is repeated. If, by contrast, the update completion notice is received (S690: NO), the vehicle information is transmitted to the UID 40 (S720), and then a check is performed to determine whether key information (including vehicle information about BCM [1] 10*a*) is received from the UID 40 (S730).

If the key information is not received (S730: NO), processing returns to S720. If, by contrast, the key information is received (S730: YES), a key information update is performed (S740). In other words, newly received key information is registered without deleting the key information registered in BCM [2] 10*b*.

The key information includes the vehicle information about BCM [1] 10*a* so that BCMs 10*a*, 10*b* share mutual vehicle information. Further, a storage area is generated for the registration of new vehicle information 18 (vehicle information about BCM [1] 10*a*).

Upon completion of the above steps, the multiple registration process by BCM [2] 10*b* terminates.

Figure 7:
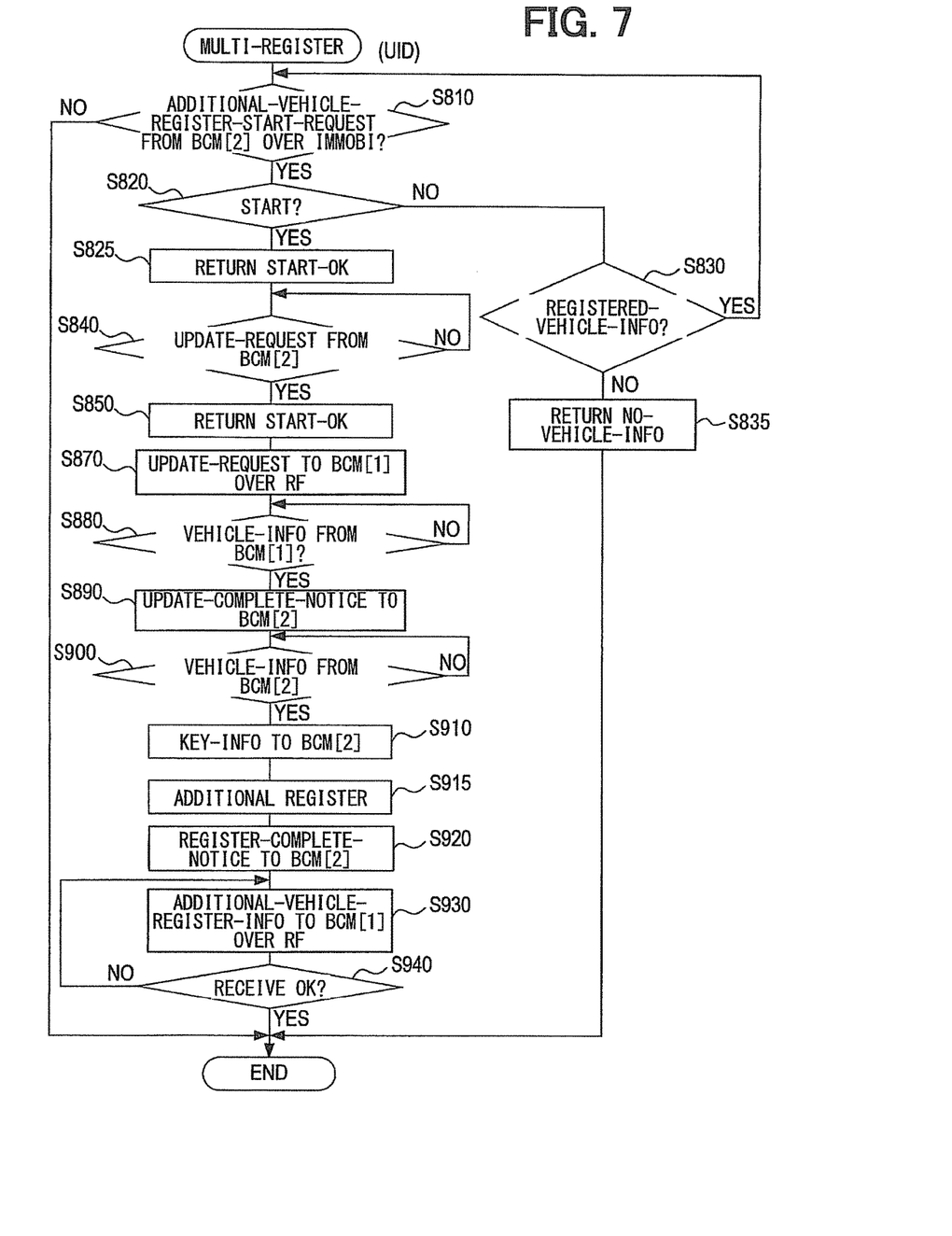
FIG. 7 is a flowchart illustrating a multiple registration process that is performed by the LFIC of the UID.

The UID 40 performs a multiple registration process that corresponds to the multiple registration process by BCM [2] 10*b*. The multiple registration process by the UID 40 starts, for example, on a periodic basis.

In the multiple registration process by the UID 40, a check is performed in FIG. 7 to determine whether an additional vehicle registration start request is received from BCM [2] 10*b* through immobilizer communication (S810). If the additional vehicle registration start request is not received (S810: NO), the multiple registration process terminates.

If the additional vehicle registration start request is received (S810: YES), a check is performed to determine whether or not to start multiple registration (S820). The overwrite registration can be started when relevant conditions are satisfied, that is, when the vehicle information is already registered and the operating voltage (battery voltage) for the UID 40 is adequate.

If there is a problem with starting the multiple registration (S820: NO), a check is performed to determine whether there is registered vehicle information (S830). If there is registered vehicle information (S830: YES), processing returns to S810.

If there is no registered vehicle information (S830: NO), a signal indicating that no vehicle information is found is returned to BCM [2] 10b (S835). If there is no problem with starting the multiple registration in S820 (S820: YES), a signal indicating that the multiple registration can be started (start OK) is returned to BCM [2] 10b (S825). Next, a check is performed to determine whether an update request is received from BCM [2] 10b (S840).

If the update request is not received (S840: NO), S840 is repeated. If, by contrasts, the update request is received (S840: YES), a signal indicating that the update can be performed (start OK) is returned to BCM [2] 10b (S850).

An update request for the update of vehicle information is issued to BCM [1] 10a through RF communication (S870). A check is then performed to determine whether the vehicle information is received from BCM [1] 10a (S880).

If the vehicle information is not received from BCM [1] 10a (S880: NO), processing returns to S870. If, by contrast, the vehicle information is received from BCM [1] 10a (S880: YES), an update completion notice indicative of the completion of update preparation is transmitted to BCM [2] 10b (S890).

A check is performed to determine whether vehicle information is received from BCM [2] 10b (S900). If the vehicle information is not received (S900: NO), S900 is repeated. If, by contrast, the vehicle information is received (S900: YES), key information (including the vehicle information about BCM [1] 10a) is transmitted to BCM [2] 10b (S910), and additional vehicle registration is performed locally (S915).

In the additional vehicle registration process, the vehicle information about BCM [1] 10a is registered in the UID 40. After the vehicle information is registered in this manner, the registered vehicle information is transmitted as the key information when authentication is to be achieved with respect to BCMs 10a, 10b.

A registration completion notice is transmitted to BCM [2] 10b (S920), and then additional vehicle registration information is transmitted to BCM [1] 10a through RF communication (S930). Here, the additional vehicle registration information is the vehicle information about BCM [2] 10b.

A check is performed to determine whether an additional registration information OK notice indicative of the completion of additional registration is received from BCM [1] 10a (S940). If the additional registration information OK notice is not received (S940: NO), processing returns to S930.

If the additional registration information OK notice is received (S940: YES), the multiple registration process by the UID 40 terminates.

Figure 8:
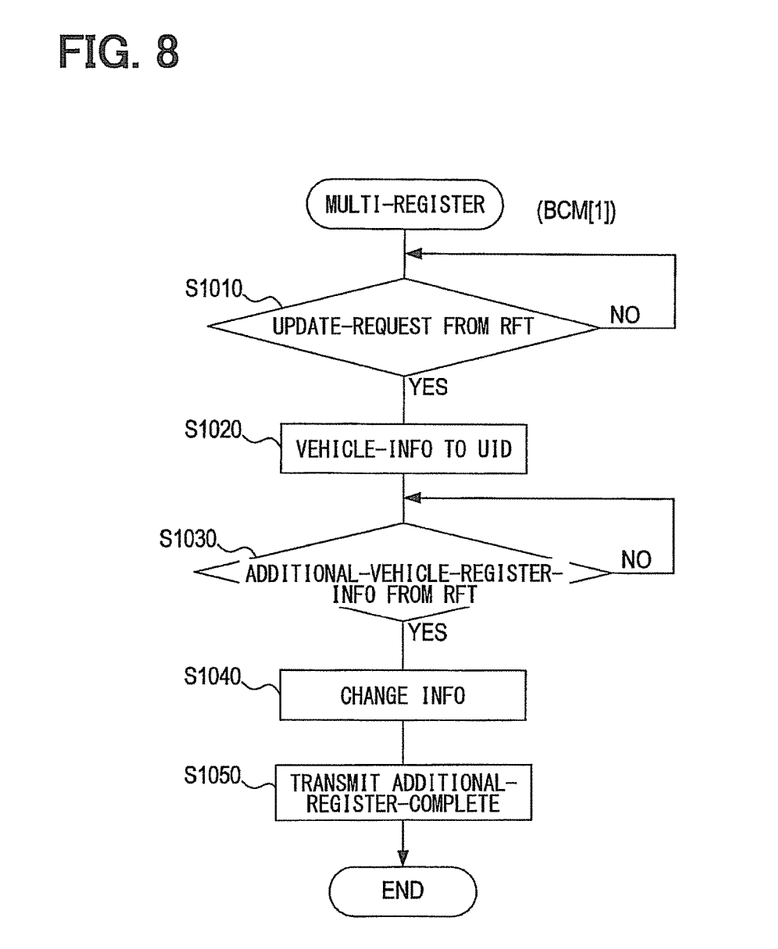
FIG. 8 is a flowchart illustrating a multiple registration process that is performed by the microcomputer of BCM [1].

BCM [1] 10a performs a multiple registration process that corresponds to the multiple registration process by the UID 40. The multiple registration process by BCM [1] 10a is initiated when a vehicle in which BCM [1] 10a is mounted is turned on, and subsequently repeated at fixed time intervals.

In this process, a check is performed as in FIG. 8 to determine whether an update request is received from the UID 40 (RFT 30a, 30b) (S1010). If the update request is not received (S1010: NO), S1010 is repeated.

If the update request is received (S1010: YES), the locally possessed vehicle information is transmitted to the UID 40 (S1020). Next, a check is performed to determine whether additional vehicle registration information is received from the UID 40 (RFT 30a, 30b) (S1030).

If the additional vehicle registration information is not received (S1030: NO), processing returns to S1020. If, by contrast, the additional vehicle registration information is received (S1030: YES), the vehicle information is changed based on the received additional vehicle registration information (S1040), and then an additional registration information OK signal (additional registration completion) indicative of the completion of additional registration is transmitted to the UID 40 (S1050). This terminates the multiple registration process performed by BCM [1] 10a.

[Advantageous Effects of Present Embodiment]

The vehicle control system 1, which has been described in detail above, includes BCM [1] 10a, BCM [2] 10b, and the UID 40. BCM [1] 10a and BCM [2] 10b is used to control a vehicle. The UID 40 is possessed by the user and used to achieve authentication with respect to BCM [1] 10a and BCM [2] 10b.

BCM [1] 10a and BCM [2] 10b, which are mounted in a vehicle, control the vehicle when authentication is achieved with respect to the UID 40 possessed by the user. Further, BCM [1] 10a and BCM [2] 10b acquire authentication information from the UID 40 through predefined LF communication, change locally possessed authentication information, and additionally establish RF communication, which is different from the LF communication. Moreover, BCM [1] 10a and BCM [2] 10b change the locally possessed authentication information upon receipt of an authentication information change command that is used to change the authentication information for achieving authentication with respect to the UID 40 through RF communication.

The UID 40 establishes LF communication with BCM [2] 10b in order to change the authentication information for authenticating the UID 40 with respect to BCM [2] 10b. Upon receipt of a notice indicative of the authentication information change from BCM [2] 10b, the UID 40 establishes RF communication, which is different from the LF communication, in order to communicate with BCM [1] 10a, which is different from BCM [2] 10b.

In other words, the UID 40 according to the present embodiment communicates, with BCM [2] 10b in order to overwrite or delete the authentication information recorded in BCM [2] 10b, register new authentication information in BCM [2] 10b, or otherwise change the authentication information in BCM [2] 10b. Upon completion of such a change, the UID 40 communicates with BCM [1] 10a.

As above, the vehicle control system 1 communicates with BCM [1] 10a upon an authentication information change in BCM [2] 10b. Therefore, the vehicle control system 1 provides improved security as compared to a configuration where communication is established at all times. Further, as the communication technique is changed in this instance, the resulting level of security is higher than when a single communication technique is used. Consequently, the authentication information can be exchanged with a plurality of BCMs, namely, BCM [1] 10a and BCM [2] 10b, while maintaining an adequate level of security.

The UID 40 in the vehicle control system 1 transmits the authentication information change command that changes the authentication information for authenticating the UID 40 with respect to BCM [1] 10a.

As the vehicle control system 1 is configured so that the authentication information change command is transmitted to BCM [1] 10a, the authentication information change in a plurality of BCMs, namely, BCM [1] 10a and BCM [2] 10b, can be completed in a single process.

The UID 40 in the vehicle control system 1 transmits the authentication information change command that overwrites the authentication information registered in BCM [2] 10b with the authentication information for the UID 40 and deletes the authentication information registered in BCM [1] 10*a*.

When a vehicle in which BCM [1] 10*a* is mounted is to be replaced by a newly purchased vehicle in which BCM [2] 10*b* is mounted, the vehicle control system 1 makes it easy to change the registered authentication information.

The UID 40 in the vehicle control system 1 registers the authentication information for the UID 40 in addition to the authentication information registered in BCM [2] 10*b*. Further, the UID 40 transmits the authentication information change command that registers the authentication information for the UID 40 in addition to the authentication information registered n BCM [1] 10*a*.

The vehicle control system 1 is capable of additionally registering the authentication information for the UID 40 in a vehicle in which authentication information is already registered. Besides, the vehicle control system 1 is configured so that RF communication provides longer-distance communication than LF communication.

In other words, in-vehicle short-distance communication is used in order to maintain an adequate level of security when communication is to be established to change the authentication information in BCM [2] 10*b*. Meanwhile, for the communication with BCM [1] 10*a*, an adequate communication distance is provided to be able to communicate with BCM [1] 10*a* from a host vehicle. Consequently, the vehicle control system 1 is capable of providing increased work efficiency when the UID 40 is disposed in a vehicle in which BCM [2] 10*b* is mounted.

The vehicle control system 1 adopts communication techniques currently available for vehicles without having to change the maximum communication distance that varies from one communication technique to another.

[Alternative Embodiments]

The present disclosure is not to be interpreted as limited to the foregoing embodiment. Further, an exemplary configuration obtained by eliminating some elements in the configuration of the foregoing embodiment without being unable to achieve the object of the present disclosure also provides an embodiment of the present disclosure. Furthermore, an exemplary configuration obtained by combining the above-mentioned embodiments as appropriate also provides an embodiment of the present disclosure.

The UID 40 in the above-described vehicle control system 1 transmits a command for changing the authentication provided by BCM [1] 10*a* when the information about authentication with respect to BCM [2] 10*b* is changed. However, an alternative would be to simply notify BCM [1] 10*a* of the change in the information about authentication with respect to BCM [2] 10*b*. In such an alternative embodiment, a notice process may be performed in place of processing in S240 and S250, which are depicted in FIG. 2.

In the above-mentioned alternative embodiment, the vehicle control system 1 transmits a change in the information about authentication with respect to BCM [2] 10*b* to BCM [1] 10*a*. This enables BCM [1] 10*a* to make a backup of the change in the information about authentication.

BCM [1] 10*a* and BCM [2] 10*b* in the foregoing embodiments are also referred to as a vehicle control apparatus. The UID 40 in the foregoing embodiments is also referred to as a portable communication apparatus. LF communication in the foregoing embodiments is also referred to as a first communication technique. RF communication in the foregoing embodiments is also referred to as a second communication technique.

Processing S110 to S250 and S610 to S730 in the foregoing embodiments is also referred to as an authentication acquisition and change section. Processing S360 to S390 and S910 is also referred to as an authentication information change section. Processing S430, S440, and S930 is also referred to as a post-change communication section. Processing S510 to S530 and S1010 to S1050 is also referred to as a second-technique communication section.

Further, processing step S1040 in the foregoing embodiments is also referred to as a command acquisition and change section.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A portable communication apparatus that is capable of communication with a plurality of vehicle control apparatuses that respectively control a plurality of vehicles, and is capable of achieving authentication with respect to the vehicle control apparatuses, the portable communication apparatus having a memory with computer-executable instructions that, when executed by the portable communications apparatus, configure the portable communications apparatus to implement:

an authentication information change section that communicates with a first vehicle control apparatus that is one of the plurality of vehicle control apparatuses, by using a predefined first communication technique, wherein the communications with the first vehicle control apparatus comprise:

receiving a registration start request front the first vehicle control apparatus;

receiving vehicle information from the first vehicle control apparatus in response to receiving the vehicle information;

and sending authentication information to the first vehicle control apparatus;

and wherein subsequent to receiving the sent authentication information, the first vehicle control apparatus uses the received authentication information to authenticate with the portable communication apparatus;

and a most communication section that, upon receipt of a notice from the first vehicle control apparatus indicative of having received the sent authentication information, communicates with a second vehicle control apparatus that is one of the plurality of vehicle control apparatuses and different from the first vehicle control apparatus, by using a second communication technique that is different from the predefined first communication technique;

wherein the communications with the second vehicle control apparatus comprise:

sending a deletion request to the second vehicle control apparatus;

receiving a deletion complete notice from the second vehicle control apparatus indicating that the second vehicle control apparatus has deleted previous authentication information previously used to authenticate the second vehicle control apparatus with the portable communication apparatus;

and wherein subsequent to deleting the previous authentication information, the second vehicle control apparatus is unable to authenticate with the portable communication apparatus.

\* \* \* \* \*